(12) United States Patent
Kamila et al.

(10) Patent No.: US 10,793,251 B2
(45) Date of Patent: Oct. 6, 2020

(54) HINGE PINS FOR FOLDABLE AIRCRAFT WINGS

(71) Applicant: The Boeing Company, Chicago, IL (US)

(72) Inventors: Eric S. Kamila, Edmonds, WA (US); Warren H. Steyaert, Snohomish, WA (US); David D. Boes, Bellevue, WA (US); Daniel E. McGinty, Snohomish, WA (US); Ryan A. Fear, Kirkland, WA (US); Renato Felicio, Mulkilteo, WA (US); Eric G. Gruner, Seattle, WA (US); Matthew S. Elenbaas, Mukilteo, WA (US); Ian C. Burford, Duvall, WA (US); Eric D. Blohm, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 216 days.

(21) Appl. No.: 15/928,872

(22) Filed: Mar. 22, 2018

(65) Prior Publication Data
US 2019/0291847 A1 Sep. 26, 2019

(51) Int. Cl.
*B64C 3/56* (2006.01)

(52) U.S. Cl.
CPC ...................... *B64C 3/56* (2013.01)

(58) Field of Classification Search
CPC ..... B64C 3/56; B64C 2201/027; B64C 19/00; B64C 21/08; B64C 2201/20; B64C 9/04; B64C 11/28; B64C 13/04; B64C 13/16; B64C 13/28; B64C 2201/104; B64C 39/10; G05D 1/101; G05D 1/0202; G05D 1/0808; G05D 1/042; G05D 1/0607; G05D 1/0684; B64F 1/222; B64F 1/362; E04H 15/48; A44B 18/0069; B29C 65/02; B29C 65/568; B29C 70/30; F16B 1/00; F16B 1/02; F16B 2001/0028; F16B 5/02; F16C 11/06; F16H 2025/2445; F16H 2025/2481;
(Continued)

(56) References Cited

U.S. PATENT DOCUMENTS

| 5,372,336 A | 12/1994 | Paez |
| 5,558,299 A * | 9/1996 | Veile .................. B64C 3/56 244/49 |
| 2013/0099060 A1 | 4/2013 | Dees et al. |

FOREIGN PATENT DOCUMENTS

| CN | 105438443 | 3/2016 |
| CN | 106184711 | 12/2016 |

(Continued)

OTHER PUBLICATIONS

European Patent Office, "Extended European Search Report," issued in connection with European Patent Application No. 19164731.2, dated Jun. 7, 2019, 8 pages.

*Primary Examiner* — Timothy D Collins
*Assistant Examiner* — Carlos A Rodriguez Larrotta
(74) *Attorney, Agent, or Firm* — Hanley, Flight & Zimmerman, LLC

(57) ABSTRACT

Hinge pins for foldable aircraft wings are described. An example apparatus includes a hinge pin to rotatably couple a foldable tip of an aircraft wing to a fixed structure of the aircraft wing. The hinge pin includes a first flange, a second flange spaced apart from the first flange along a central axis of the hinge pin, and a through hole oriented along the central axis.

21 Claims, 11 Drawing Sheets

(58) Field of Classification Search
CPC ........ F16H 25/2204; F16H 25/24; F16L 3/18;
F16L 3/202; F16L 3/26
USPC .......................................................... 244/49
See application file for complete search history.

(56) References Cited

FOREIGN PATENT DOCUMENTS

| | | |
|---|---|---|
| GB | 934286 | 8/1963 |
| WO | 2008024178 | 2/2008 |

\* cited by examiner

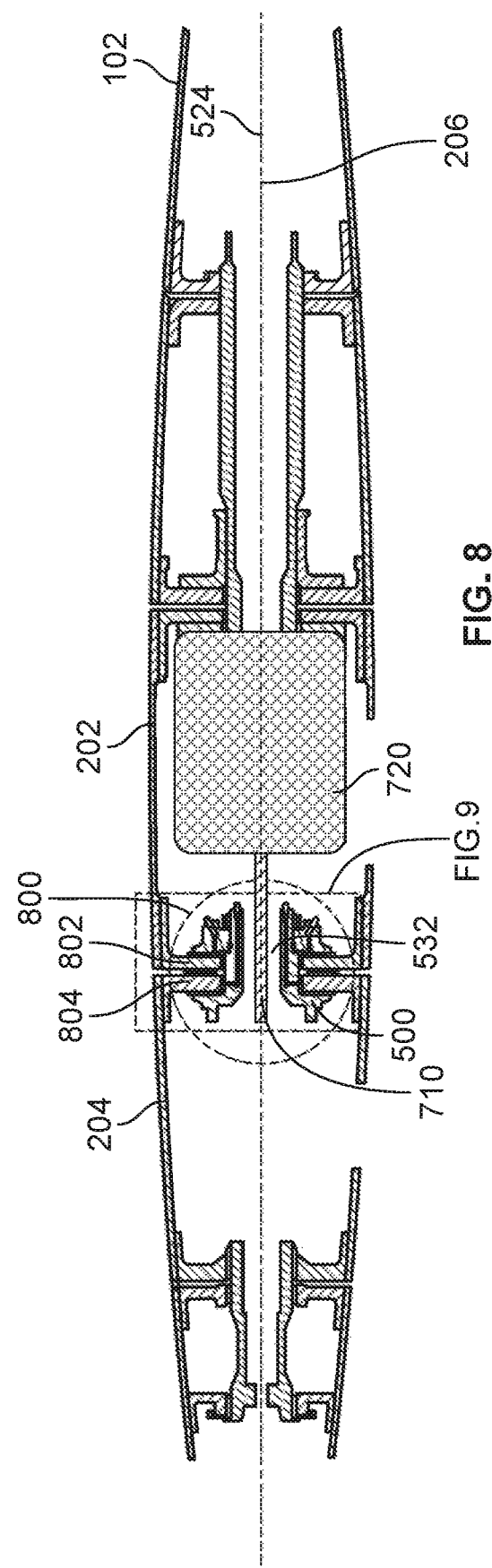

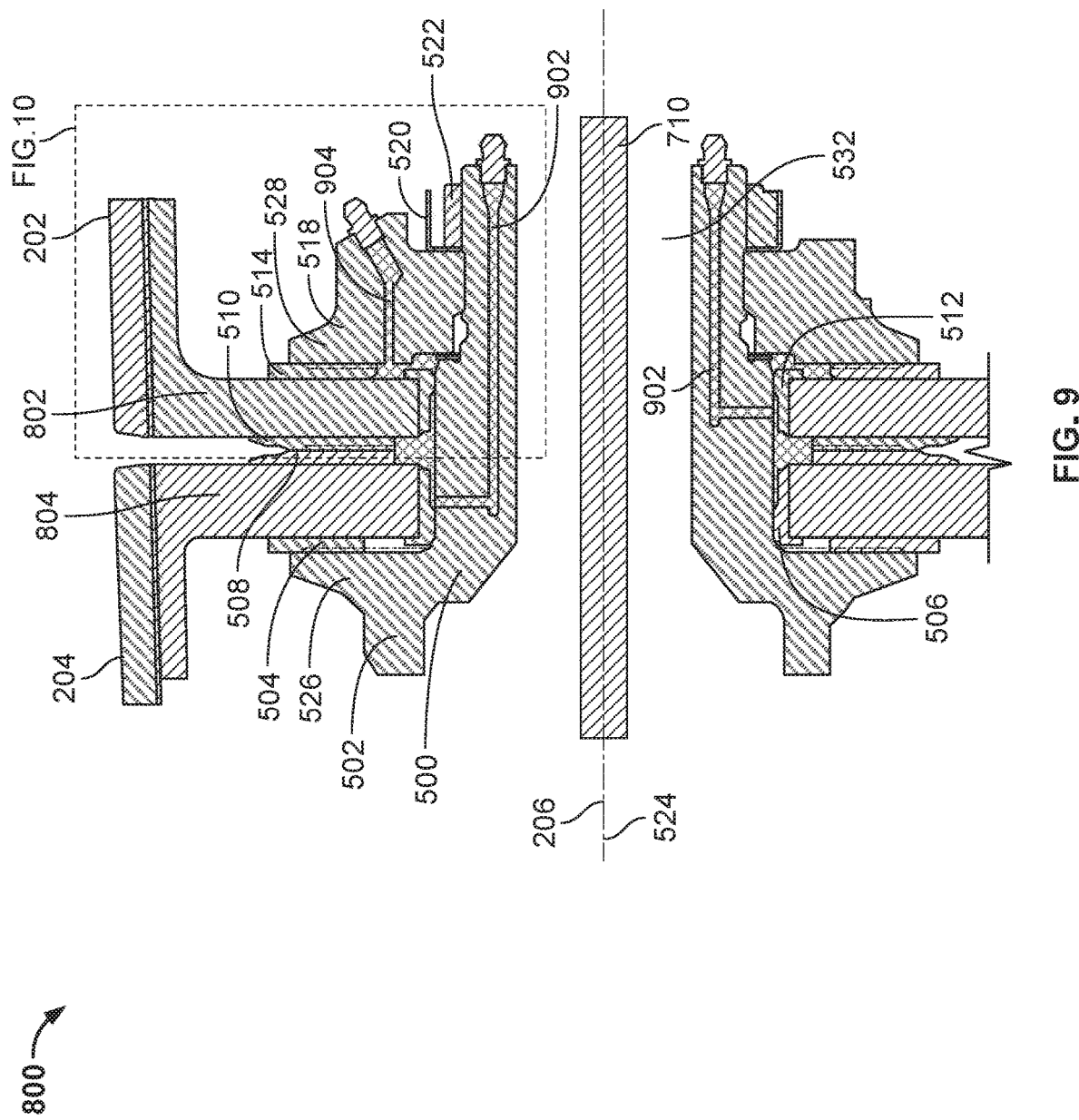

HINGE PINS FOR FOLDABLE AIRCRAFT WINGS

FIELD OF THE DISCLOSURE

This disclosure relates generally to hinge pins and, more specifically, to hinge pins for foldable aircraft wings.

BACKGROUND

Long span wings are desirable for commercial aircraft, as such wings are more aerodynamically efficient relative to wings having a shorter span. Greater aerodynamic efficiency reduces fuel consumption, which reduces operating costs. The wingspan of an aircraft may be constrained based on dimensional limits and/or regulations imposed by the International Civil Aviation Organization (ICAO), and/or based on physical infrastructure limitations of airports (e.g., the relative sizes of runways, taxiways, gate areas, hangars, etc.).

Foldable wing designs may be used to reduce the wingspan of an aircraft when the aircraft is not in flight (e.g., when the aircraft is taxiing, parked, and/or stored). Such designs commonly include a foldable outboard section (e.g., a foldable tip structure) of the wing that is hinged and/or rotatably coupled to a fixed inboard section (e.g., a fixed structure) of the wing. The hinged and/or rotatable coupling enables movement of the foldable outboard section relative to the fixed inboard section between an unfolded position (e.g., a flight position) and a folded position (e.g., a stowed position). The foldable outboard section may be moved from the folded position to the unfolded position prior to takeoff of the aircraft to increase the wingspan of the aircraft. The foldable outboard section may conversely be moved from the unfolded position to the folded position subsequent to landing of the aircraft to decrease the wingspan of the aircraft.

SUMMARY

Hinge pins for foldable aircraft wings are disclosed herein. In some examples, an apparatus is disclosed. In some disclosed examples, the apparatus comprises a hinge pin. In some disclosed examples, the hinge pin is to rotatably couple a foldable tip of an aircraft wing to a fixed structure of the aircraft wing. In some disclosed examples, the hinge pin includes a first flange, a second flange spaced apart from the first flange along a central axis of the hinge pin, and a through hole oriented along the central axis.

In some examples, an apparatus is disclosed. In some disclosed examples, the apparatus comprises a hinge pin joint. In some disclosed examples, the hinge pin joint includes a foldable tip of an aircraft wing, a fixed structure of the aircraft wing, and a hinge pin. In some disclosed examples, the hinge pin rotatably couples the foldable tip to the fixed structure. In some disclosed examples, the hinge pin includes a first flange, a second flange spaced apart from the first flange along a central axis of the hinge pin, and a through hole oriented along the central axis.

In some examples, a foldable aircraft wing is disclosed. In some disclosed examples, the foldable aircraft wing comprises a foldable tip, a fixed structure, and a hinge pin. In some disclosed examples, the hinge pin rotatably couples the foldable tip to the fixed structure. In some disclosed examples, the hinge pin includes a first flange, a second flange spaced apart from the first flange along a central axis of the hinge pin, and a through hole oriented along the central axis.

In some examples, a method is disclosed. In some disclosed examples, the method comprises moving a foldable tip of an aircraft wing between a folded position and an unfolded position relative to a fixed structure of the aircraft wing. In some disclosed examples of the method, the aircraft wing includes a hinge pin rotatably coupling the foldable tip to the fixed structure. In some disclosed examples of the method, the hinge pin includes a first flange, a second flange spaced apart from the first flange along a central axis of the hinge pin, and a through hole oriented along the central axis.

BRIEF DESCRIPTION OF THE DRAWINGS

FIG. 8 is a cross-sectional view of the example foldable wing of FIGS. 1-4 and 7A taken along the example hinge axis of FIGS. 2-4 and 7A.

FIG. 9 is an enlarged view of the example hinge pin joint of FIG. 8.

Certain examples are shown in the above-identified figures and described in detail below. In describing these examples, like or identical reference numbers are used to identify the same or similar elements. The figures are not necessarily to scale, and certain features and certain views of the figures may be shown exaggerated in scale or in schematic for clarity and/or conciseness.

DETAILED DESCRIPTION

The example hinge pins for foldable aircraft wings disclosed herein advantageously include a first flange, a second flange spaced apart from the first flange along a central axis of the hinge pin, and a through hole oriented along the central axis. The hinge pin, a foldable tip structure of a foldable wing, and a fixed structure of the foldable wing form a hinge pin joint. The through hole of the hinge pin receives a drive shaft that is operatively coupled to a rotary fold actuator. Such an arrangement enables the rotary fold actuator to advantageously be located on the foldable tip structure of the foldable wing. The first and second flanges of the hinge pin advantageously stabilize the hinge pin joint in response to single-shear loading. The first and second flanges of the hinge pin also advantageously reduce non-uniform load distributions on bearing surfaces of the foldable tip and fixed structures in response to single-shear loading. The hinge pin enables the foldable tip structure to fold relative to the fixed structure when the foldable wing is not subjected to in-flight loads. The hinge pin advantageously reacts in-flight loads (e.g., axial loads, bending loads, etc.) when the foldable wing is in an unfolded position and the aircraft is airborne.

Figure 1:
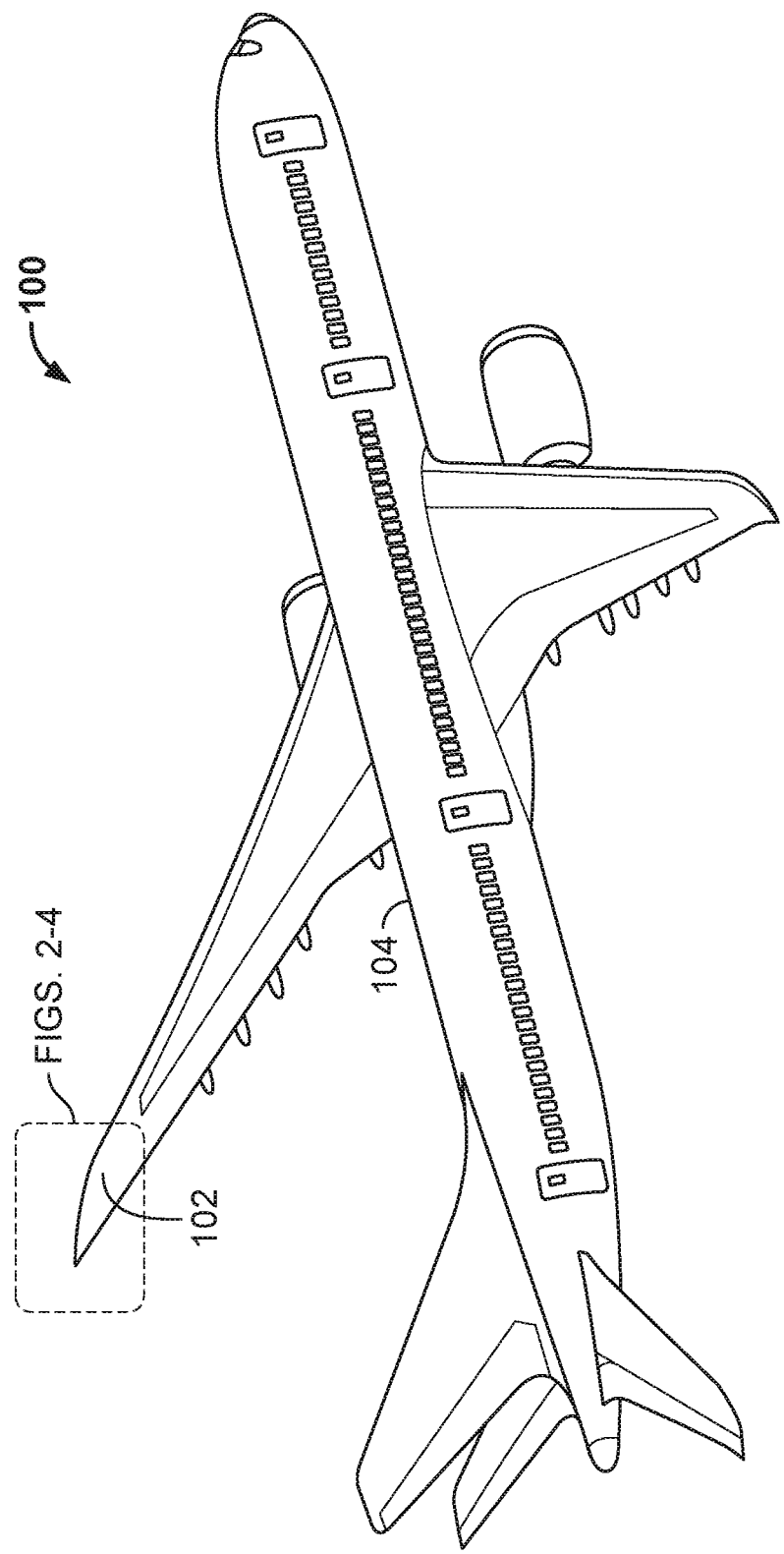
FIG. 1 is a perspective view of an example aircraft having an example foldable wing.
Figure 2:
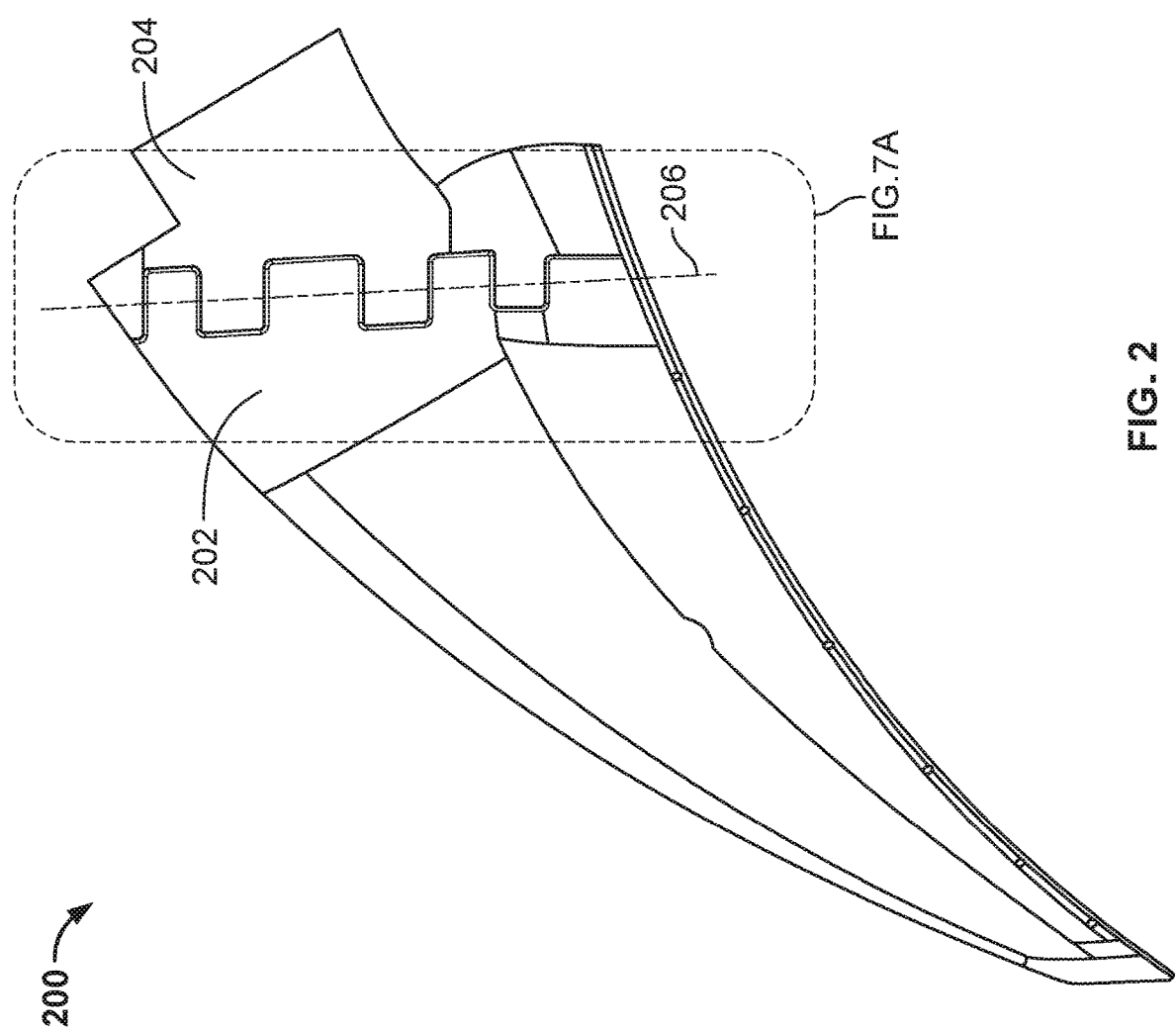
FIG. 2 is a plan view of the example foldable wing of FIG. 1 in an example unfolded position.
Figure 3:
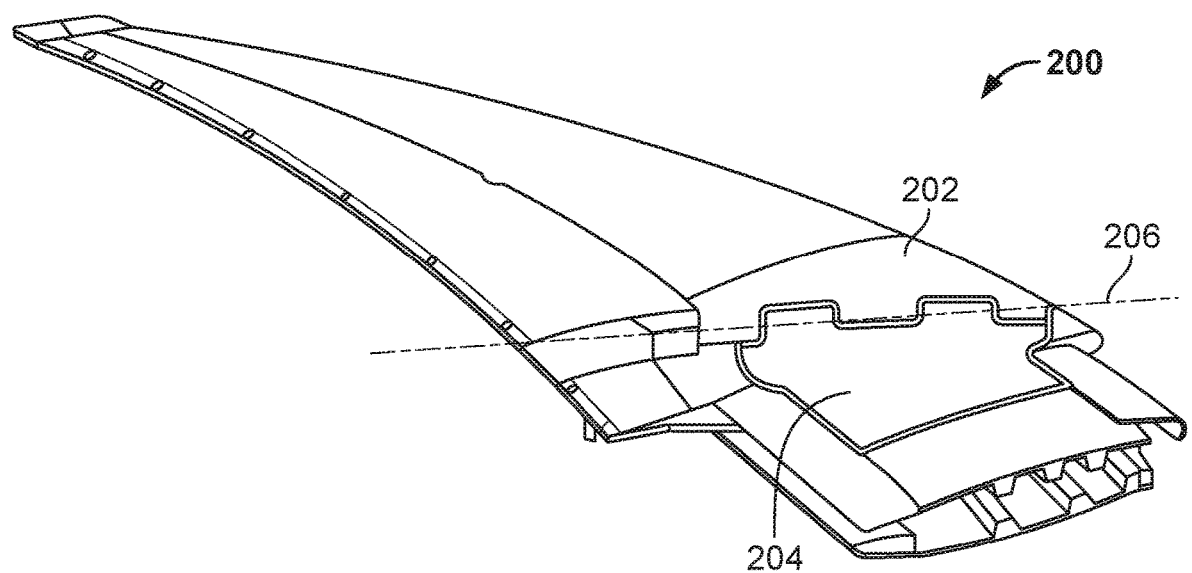
FIG. 3 is a perspective view of the example foldable wing of FIGS. 1 and 2 in the example unfolded position of FIG. 2.
Figure 4:
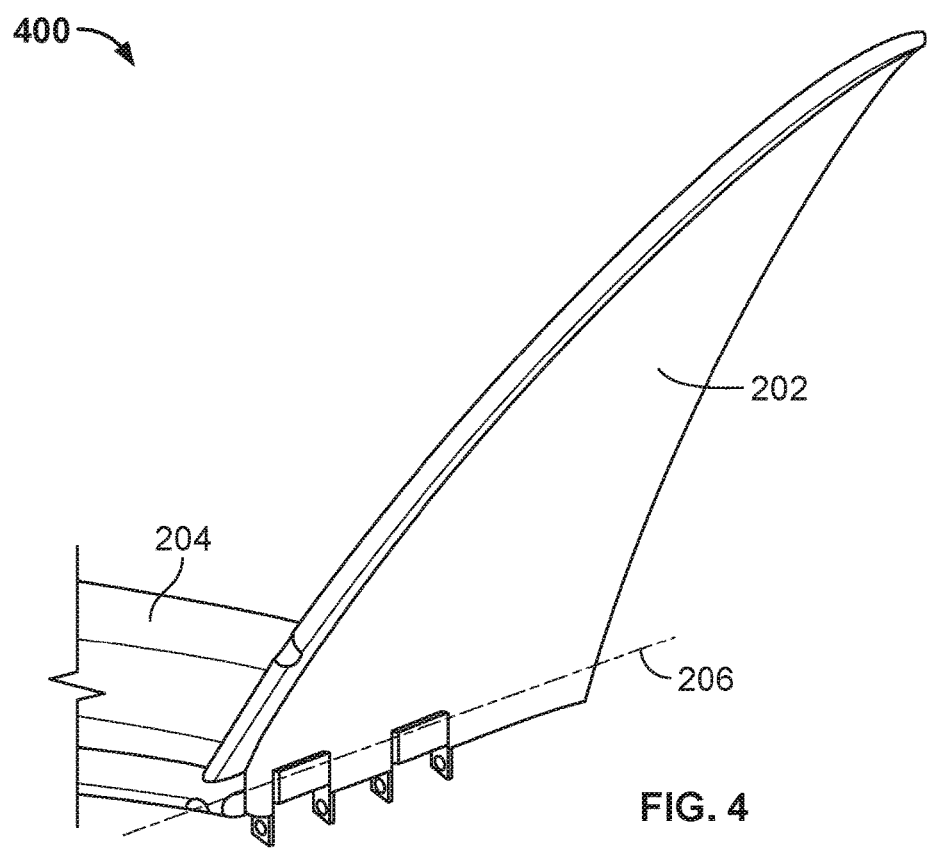
FIG. 4 is a perspective view of the example foldable wing of FIGS. 1-3 in an example folded position.

FIG. 1 is a perspective view of an example aircraft 100 having an example foldable wing 102. FIG. 2 is a plan view of the example foldable wing 102 of FIG. 1 in an example unfolded position 200. FIG. 3 is a perspective view of the example foldable wing 102 of FIGS. 1 and 2 in the example unfolded position 200 of FIG. 2. FIG. 4 is a perspective view of the example foldable wing 102 of FIGS. 1-3 in an example folded position 400. The foldable wing 102 of FIGS. 1-4 includes one or more hinge pin(s) constructed in accordance with the teachings of this disclosure, as further described below in connection with FIGS. 5-10.

In the illustrated example of FIGS. 1-4, the foldable wing 102 includes an example foldable tip structure 202 and an example fixed structure 204. The foldable tip structure 202 of FIG. 2 is a foldable outboard section of the foldable wing 102. The fixed structure 204 of FIG. 2 is a fixed inboard section of the foldable wing 102. The fixed structure 204 of the foldable wing 102 is fixedly and/or rigidly coupled (e.g., directly or indirectly) to an example fuselage 104 of the aircraft 100. The foldable tip structure 202 of the foldable wing 102 is rotatable and/or foldable relative to the fixed structure 204 of the foldable wing 102.

In the illustrated example of FIGS. 1-4, the foldable tip structure 202 may be rotated and/or folded relative to the fixed structure 204 between the unfolded position 200 of FIGS. 2 and 3 and the folded position 400 of FIG. 4. In some examples, the foldable tip structure 202 is parallel to the fixed structure 204 when the foldable tip structure 202 is in the unfolded position 200 of FIGS. 2 and 3. In some examples, the foldable tip structure 202 is positioned at an angle relative to the fixed structure 204 when the foldable tip structure 202 is in the folded position 400 of FIG. 4. In the illustrated example of FIG. 4, the foldable tip structure 202 is positioned at an angle of approximately eighty-five degrees relative to the position of the fixed structure 204. In other examples, the angle between the foldable tip structure 202 and the fixed structure 204 may be less than or greater than eighty-five degrees (e.g., ninety degrees, forty-five degrees, one hundred thirty-five degrees, etc.) when the foldable tip structure 202 is in a folded position.

Rotation and/or folding of the foldable tip structure 202 of FIGS. 2-4 relative to the fixed structure 204 of FIGS. 2-4 occurs about an example hinge line or hinge axis 206. As further described below, one or more hinge pin(s) constructed in accordance with the teachings of this disclosure is/are positioned in line with the hinge axis 206 of the foldable wing 102 such that the hinge pin(s) rotatably couple(s) the foldable tip structure 202 to the fixed structure 204. The rotatable coupling provided by the hinge pin(s) enable(s) the foldable tip structure 202 to be rotated and/or folded relative to the fixed structure 204 about the hinge axis 206. While the description of FIGS. 1-4 provided above is generally directed to a single foldable wing of an aircraft (e.g., the foldable wing 102 of the aircraft 100), it is to be understood that the aircraft may implement any number of similarly-constructed foldable wings.

Figure 5:
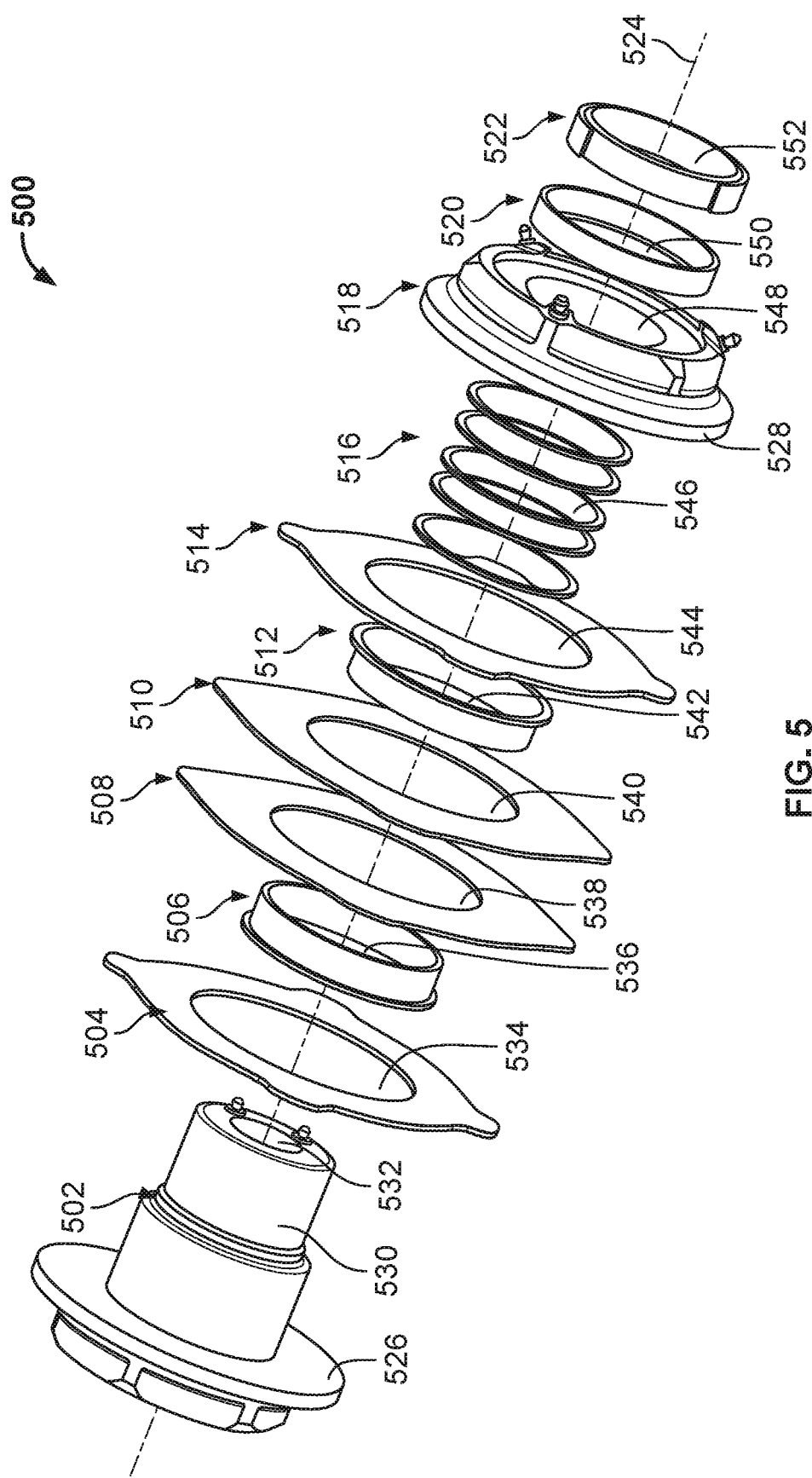
FIG. 5 is a perspective exploded view of an example hinge pin constructed in accordance with the teachings of this disclosure.
Figure 6:
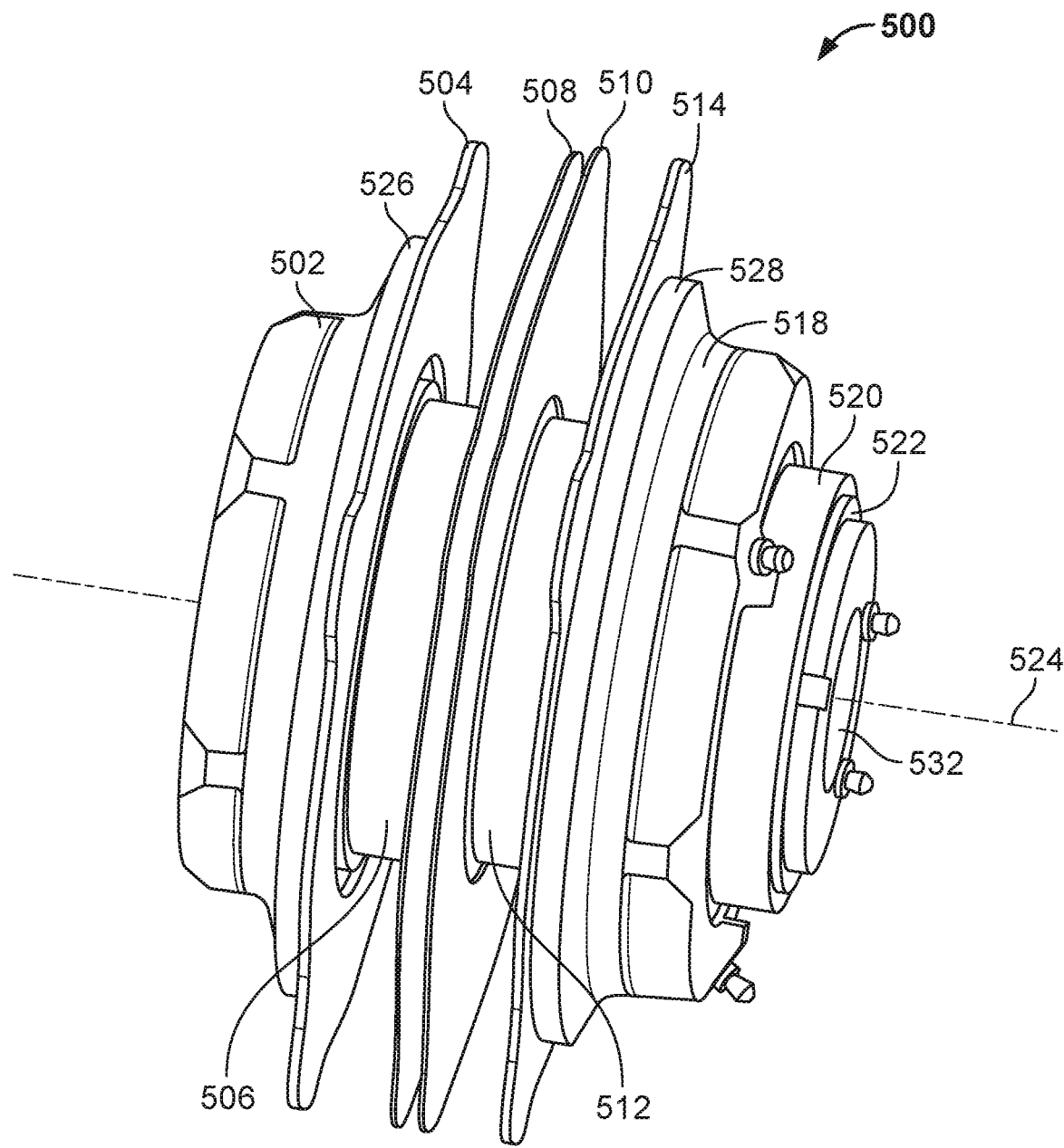
FIG. 6 is a perspective assembled view of the example hinge pin of FIG. 5, shown in isolation from the example foldable wing of FIGS. 1-4.

FIG. 5 is a perspective exploded view of an example hinge pin 500 constructed in accordance with the teachings of this disclosure. FIG. 6 is a perspective assembled view of the example hinge pin 500 of FIG. 5, shown in isolation from the example foldable wing 102 of FIGS. 1-4. The hinge pin 500 of FIGS. 5 and 6 includes an example hinge bolt 502, a first example wear plate 504, a first example bushing rib set 506, a second example wear plate 508, a third example wear plate 510, a second example bushing rib set 512, a fourth example wear plate 514, example spacers 516, an example hinge nut 518, an example lock washer 520, and an example retaining nut 522. In the illustrated example of FIGS. 5 and 6, the hinge bolt 502, the first wear plate 504, the first bushing rib set 506, the second wear plate 508, the third wear plate 510, the second bushing rib set 512, the fourth wear plate 514, the spacers 516, the hinge nut 518, the lock washer 520, and the retaining nut 522 are respectively aligned along a central axis 524 of the hinge pin 500. In some example, the central axis 524 of the hinge pin 500 of FIGS. 5 and 6 is aligned with the hinge axis 206 of the foldable wing 102 of FIGS. 1-4 when the hinge pin 500 is implemented in the foldable wing 102. The hinge pin 500 may include any number (e.g., 1, 2, etc.) of the spacers 516. In some examples, the spacers 516 may be omitted from the hinge pin 500.

In the illustrated example of FIGS. 5 and 6, the hinge bolt 502 includes a first example flange 526. The hinge nut 518 includes a second example flange 528. As shown in FIG. 6, the second flange 528 is spaced apart from the first flange 526 along the central axis 524 when the hinge pin 500 is assembled. In some examples, the first flange 526 of the hinge bolt 502 is structured to interface (e.g., apply loads to, and/or receive loads from) the fixed structure 204 of the foldable wing 102, and the second flange 528 of the hinge nut 518 is structured to interface the foldable tip structure 202 of the foldable wing 102. The hinge bolt 502 of FIGS. 5 and 6 further includes an example bolt shaft 530 and an example through hole 532. The through hole 532 of the hinge bolt 502 is oriented and/or extends along the central axis 524. In some examples, the central axis 524 of the hinge pin 500 is centrally located relative to the through hole 532.

The through hole 532 of the hinge bolt 502 of FIGS. 5 and 6 extends through the bolt shaft 530 and the first flange 526, and/or, more generally, extends through the hinge bolt 502. As shown in FIG. 5, the first wear plate 504, the first bushing rib set 506, the second wear plate 508, the third wear plate 510, the second bushing rib set 512, the fourth wear plate 514, the spacers 516, the hinge nut 518, the lock washer 520, and the retaining nut 522 of the hinge pin 500 include corresponding ones of an example first wear plate through hole 534, an example first bushing rib set through hole 536, an example second wear plate through hole 538, an example third wear plate through hole 540, an example second bushing rib set through hole 542, an example fourth wear plate through hole 544, example spacer through holes 546, an example hinge nut through hole 548, an example lock washer through hole 550, and an example retaining nut through hole 552. When the hinge pin 500 of FIGS. 5 and 6 is assembled (e.g., as shown in FIG. 6), the bolt shaft 530 of the hinge bolt 502 passes through respective ones of the first wear plate through hole 534, the first bushing rib set through hole 536, the second wear plate through hole 538, the third wear plate through hole 540, the second bushing rib set through hole 542, the fourth wear plate through hole 544, the spacer through holes 546, the hinge nut through hole 548, the lock washer through hole 550, and the retaining nut through hole 552. Respective ones of the first wear plate 504, the first bushing rib set 506, the second wear plate 508, the third wear plate 510, the second bushing rib set 512, the fourth wear plate 514, the spacers 516, the hinge nut 518, the lock washer 520, and the retaining nut 522 of the hinge pin 500 are accordingly positioned around and/or over the bolt shaft 530 of the hinge bolt 502 when the hinge pin 500 of FIGS. 5 and 6 is assembled.

When the hinge pin 500 of FIGS. 5 and 6 is implemented in the foldable wing 102 of FIGS. 1-4 (e.g., as further discussed below in connection with FIGS. 7-10), a hinge pin joint may be formed by the hinge pin 500, the foldable tip structure 202 of the foldable wing 102, and the fixed structure 204 of the foldable wing 102. The hinge pin 500 rotatably couples the foldable tip structure 202 to the fixed structure 204. In some examples, the hinge pin 500 and/or the hinge pin joint is subjected to single-shear loading. In some such examples, the first flange 526 and the second flange 528 of the hinge pin 500 are to stabilize the hinge pin joint in response to the single-shear loading. In some such examples, the first flange 526 and the second flange 528 of the hinge pin 500 are to reduce non-uniform load distributions on bearing surfaces of the foldable tip structure 202 and the fixed structure 204 in response to the single-shear loading.

For example, a rib of the fixed structure 204 may be positioned and/or located between the first wear plate 504 and the second wear plate 508 of the hinge pin 500 such that bearing surfaces of the rib of the fixed structure 204 contact and/or abut the first wear plate 504, the first bushing rib set 506, and/or the second wear plate 508 of the hinge pin 500. In such an example, the first bushing rib set 506 provides a sliding surface for the hinge pin 500. The first bushing rib set 506 also transfers bearing loads into the rib of the fixed structure 204. The first wear plate 504 and the second wear plate 508 provide wearable sliding surfaces to prevent wear on the first flange 526 of the hinge pin 500, and/or wear on the rib of the fixed structure 204. The first wear plate 504 and the second wear plate 508 also transfer axial loads into the rib of the fixed structure 204. The first flange 526 of the hinge pin 500 applies, absorbs, transfers, and/or otherwise distributes loads (e.g., single-shear loads) to, from, and/or among the first wear plate 504, the first bushing rib set 506, and/or the second wear plate 508 of the hinge pin 500, and/or the rib of the fixed structure 204.

Similarly, a rib of the foldable tip structure 202 may be positioned and/or located between the third wear plate 510 and the fourth wear plate 514 of the hinge pin 500 such that bearing surfaces of the rib of the foldable tip structure 202 contact and/or abut the third wear plate 510, the second bushing rib set 512, and/or the fourth wear plate 514 of the hinge pin 500. In such an example, the second bushing rib set 512 provides a sliding surface for the hinge pin 500. The second bushing rib set 512 also transfers bearing loads into the rib of the foldable tip structure 202. The third wear plate 510 and the fourth wear plate 514 provide wearable sliding surfaces to prevent wear on the second flange 528 of the hinge pin 500, and/or wear on the rib of the foldable tip structure 202. The third wear plate 510 and the fourth wear plate 514 also transfer axial loads into the rib of the foldable tip structure 202. The second flange 528 of the hinge pin 500 applies, absorbs, transfers, and/or otherwise distributes loads (e.g., single-shear loads) to, from, and/or among the third wear plate 510, the second bushing rib set 512, and/or the fourth wear plate 514 of the hinge pin 500, and/or the rib of the foldable tip structure 202.

Figure 7A:
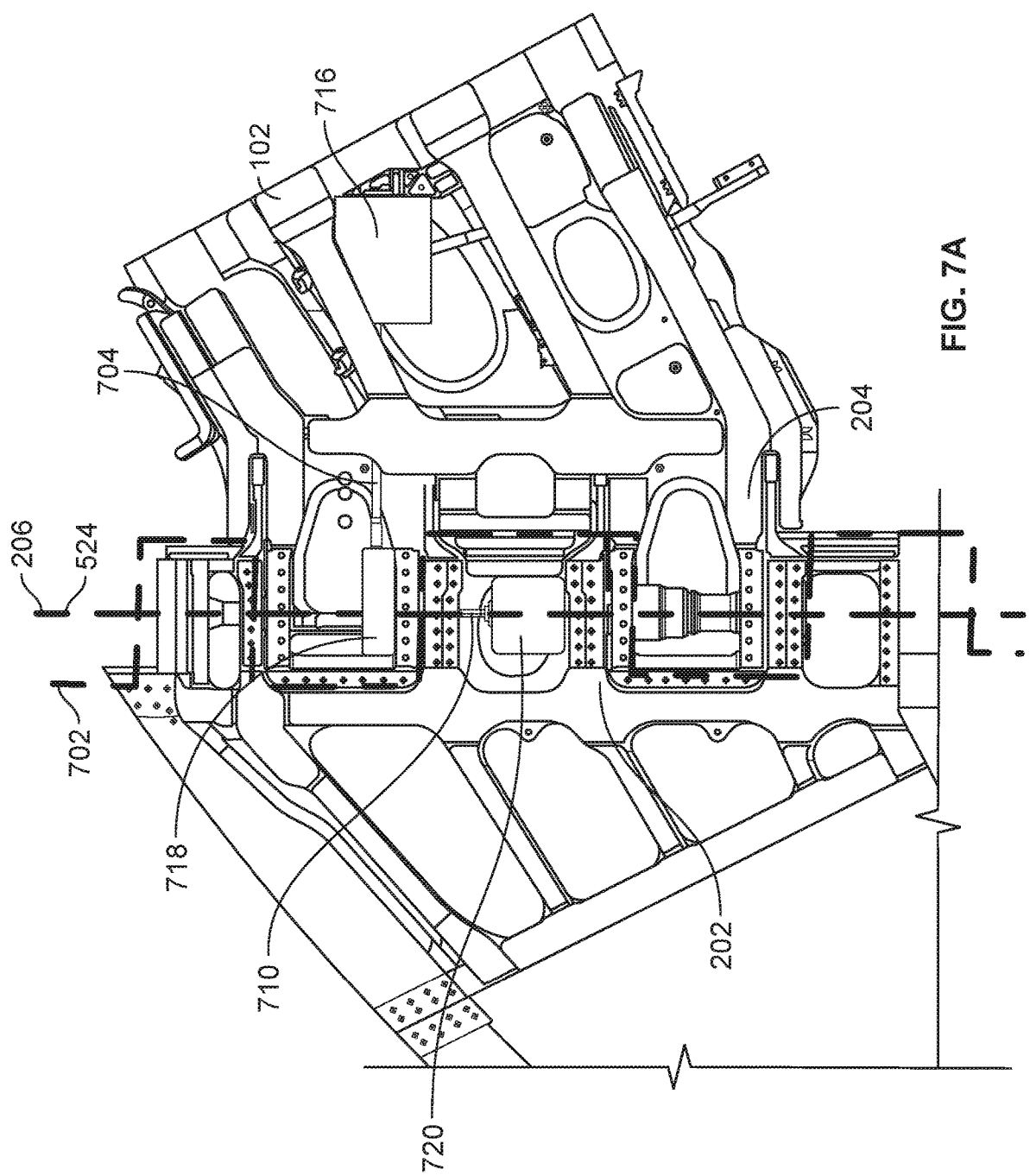
FIG. 7A is a first partial cutaway plan view of the example foldable wing of FIGS. 1-4 including the example hinge pin of FIGS. 5 and 6.
Figure 7B:
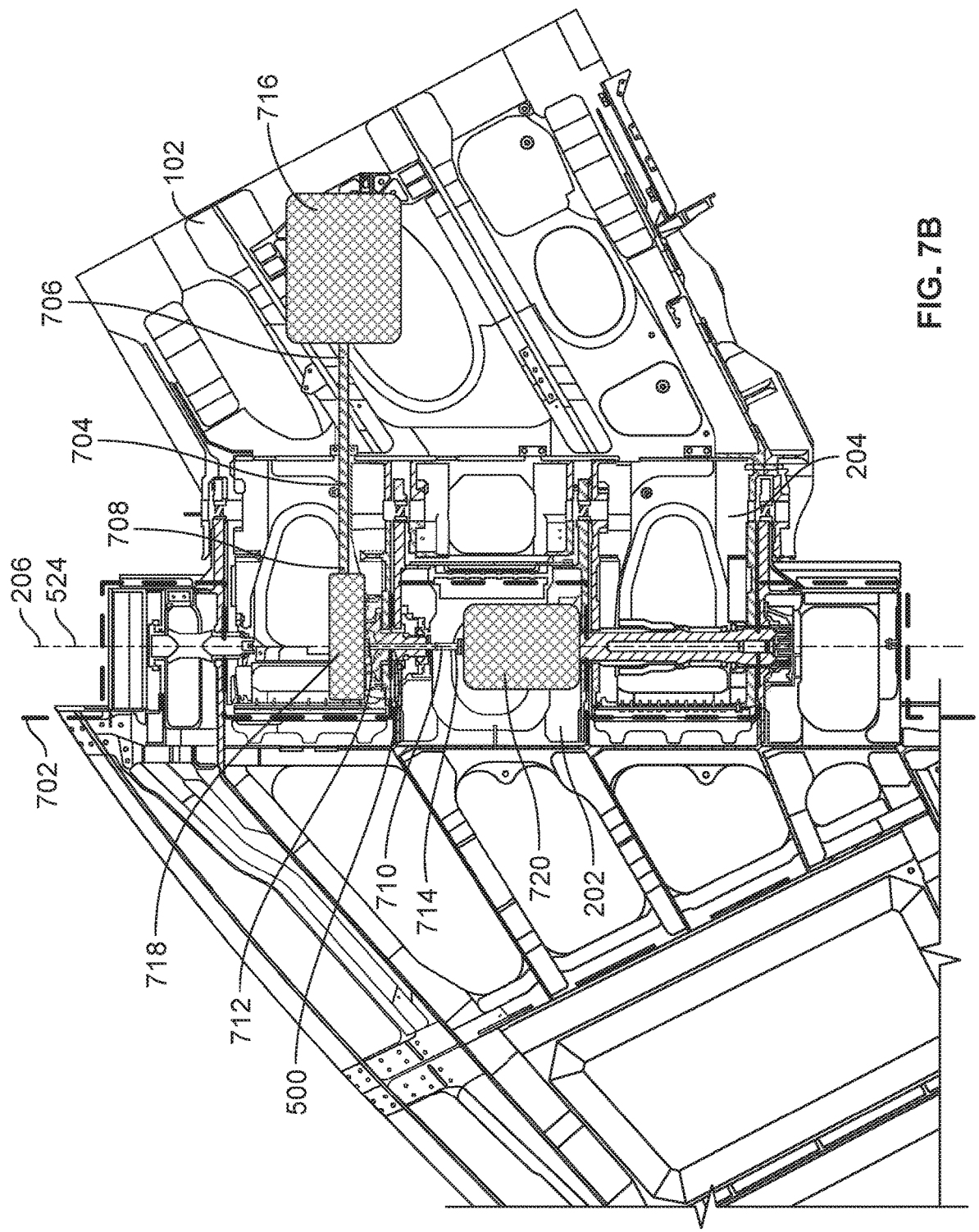
FIG. 7B is a second partial cutaway plan view of the example foldable wing of FIG. 7A.

FIG. 7A is a first partial cutaway plan view of the example foldable wing 102 of FIGS. 1-4 including the example hinge pin 500 of FIGS. 5 and 6. FIG. 7B is a second partial cutaway plan view of the example foldable wing 102 of FIG. 7A. In the illustrated example of FIGS. 7A and 7B, the hinge pin 500 (visible in FIG. 7B) rotatably couples the foldable tip structure 202 of the foldable wing 102 to the fixed structure 204 of the foldable wing 102. An example skin trim line 702 demarcates the respective structural boundaries of the foldable tip structure 202 and the fixed structure 204. The central axis 524 of the hinge pin 500 is aligned with and/or coaxially located relative to the hinge axis 206 of the foldable wing 102.

Figure 7C:
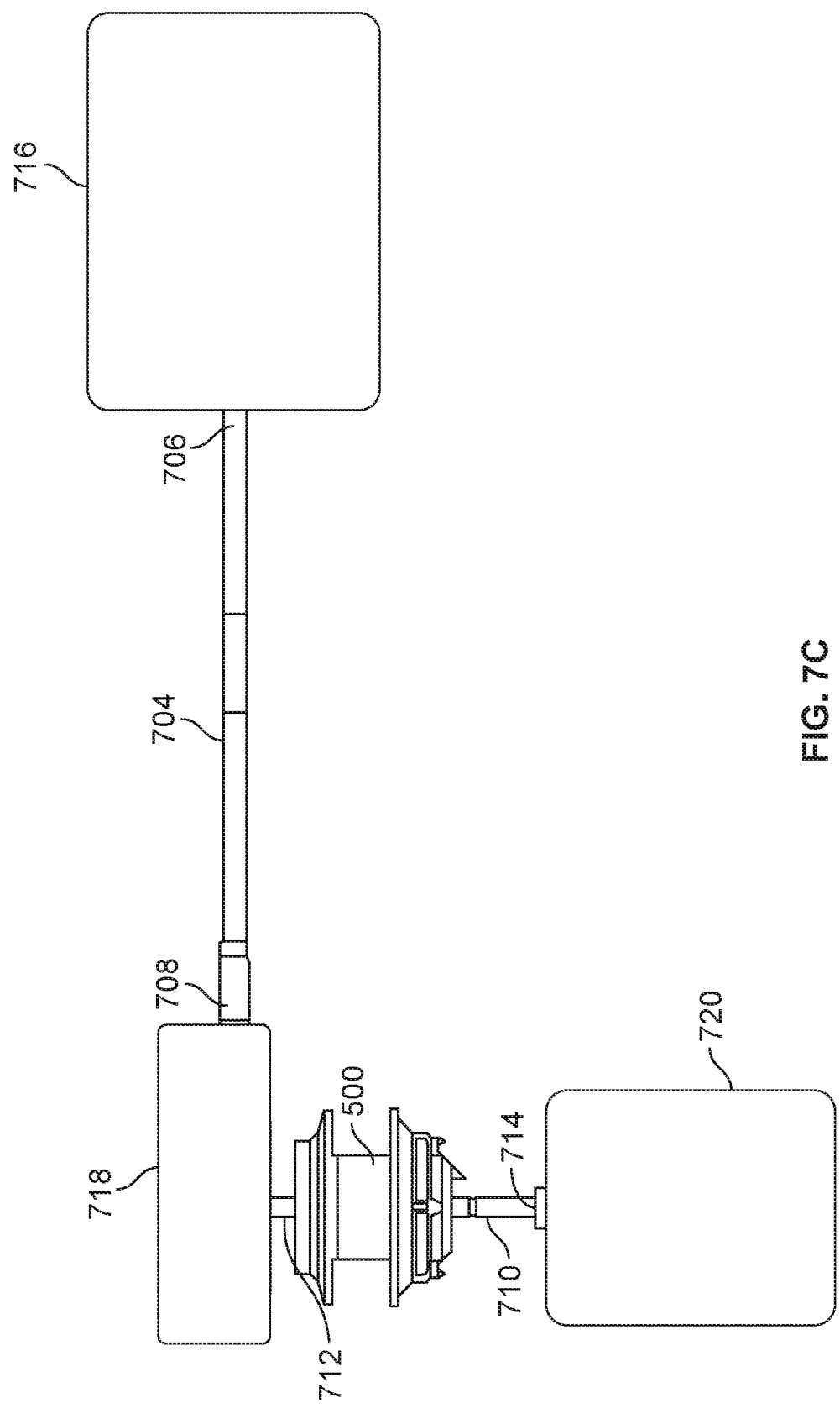
FIG. 7C is a plan view of the example hinge pin, the example first drive shaft, the example second drive shaft, the example drive unit, the example gearbox, and the example rotary fold actuator of the example foldable wing of FIGS. 7A and 7B in isolation.

In the illustrated example of FIGS. 7A and 7B, the foldable wing 102 includes a first example drive shaft 704 having an example first end 706 and an example second end 708, a second example drive shaft 710 having an example first end 712 an example second end 714, an example drive unit 716, an example gearbox 718, and an example rotary fold actuator 720. FIG. 7C is a plan view of the example hinge pin 500, the example first drive shaft 704, the example second drive shaft 710, the example drive unit 716, the example gearbox 718, and the example rotary fold actuator 720 of the example foldable wing 102 of FIGS. 7A and 7B in isolation. As shown in FIGS. 7B and 7C, the first end 706 of the first drive shaft 704 is operatively coupled to the drive unit 716. The second end 708 of the first drive shaft 704 is operatively coupled to the gearbox 718. The first end 712 of the second drive shaft 710 is also operatively coupled to the gearbox 718. The second end 714 of the second drive shaft 710 is operatively coupled to the rotary fold actuator 720. A portion of the second drive shaft 710 located between the first end 712 and the second end 714 of the second drive shaft 710 extends along the hinge axis 206 of the foldable wing 102 and passes through the through hole 532 of the hinge pin 500. In other examples, one or more other structural member(s) (e.g., one or more shaft(s), rod(s), tube(s), wire(s), etc.) of the foldable wing 102 may additionally or alternatively pass through the through hole 532 of the hinge pin 500.

The drive unit 716 of FIGS. 7A-7C drives and/or actuates the first drive shaft 704. The gearbox 718 of FIG. 7A-7C transfers rotational motion from the first drive shaft 704 to the second drive shaft 710. The rotary fold actuator 720 of FIGS. 7A-7C may be implemented as a planetary gearbox including a planetary gear set that is driven via the drive unit 716, the first drive shaft 704, the gearbox 718 and the second drive shaft 710 to assist with rotating and/or moving the foldable tip structure 202 relative to the fixed structure 204 of the foldable wing 102. In the illustrated example of FIGS. 7A-7C, the drive unit 716 and/or the gearbox 718 is/are located on and/or coupled to the fixed structure 204 of the foldable wing 102, and the rotary fold actuator 720 is located on and/or coupled to the foldable tip structure 202 of the foldable wing 102. Locating the rotary fold actuator 720 on the foldable tip structure 202 of the foldable wing 102 advantageously increases the space and/or real estate available within the fixed structure 204 of the foldable wing 102 relative to the space and/or real estate that would otherwise be available within the fixed structure 204 in instances where the rotary fold actuator 720 were located on and/or coupled to the fixed structure 204 instead of the foldable tip structure 202.

In other examples, one or more of the drive unit 716, the first drive shaft 704, and/or the gearbox 718 of FIGS. 7A-7C may be repositioned within or omitted from the foldable wing 102. In some such other examples, the first end 712 of the second drive shaft 710 may be operatively coupled to a motor located on and/or coupled to the fixed structure 204 of the foldable wing 102. In some such other examples, the motor may be an in-line motor having a rotational drive axis oriented along the hinge axis 206 of the foldable wing 102. In still other examples, the first end 712 of the second drive shaft 710 may be operatively coupled to a gear or a gear train located on and/or coupled to the fixed structure 204 of the foldable wing 102. As used herein, the term "drive component" means one or more of a gear, a gear train, a gearbox, a motor, and/or a drive unit that generates motion (e.g., rotational motion) for a structure (e.g., for a drive shaft), and/or that transfers or translates motion (e.g., rotational motion) from one structure to another (e.g., from a first drive shaft to a second drive shaft).

Figure 10:
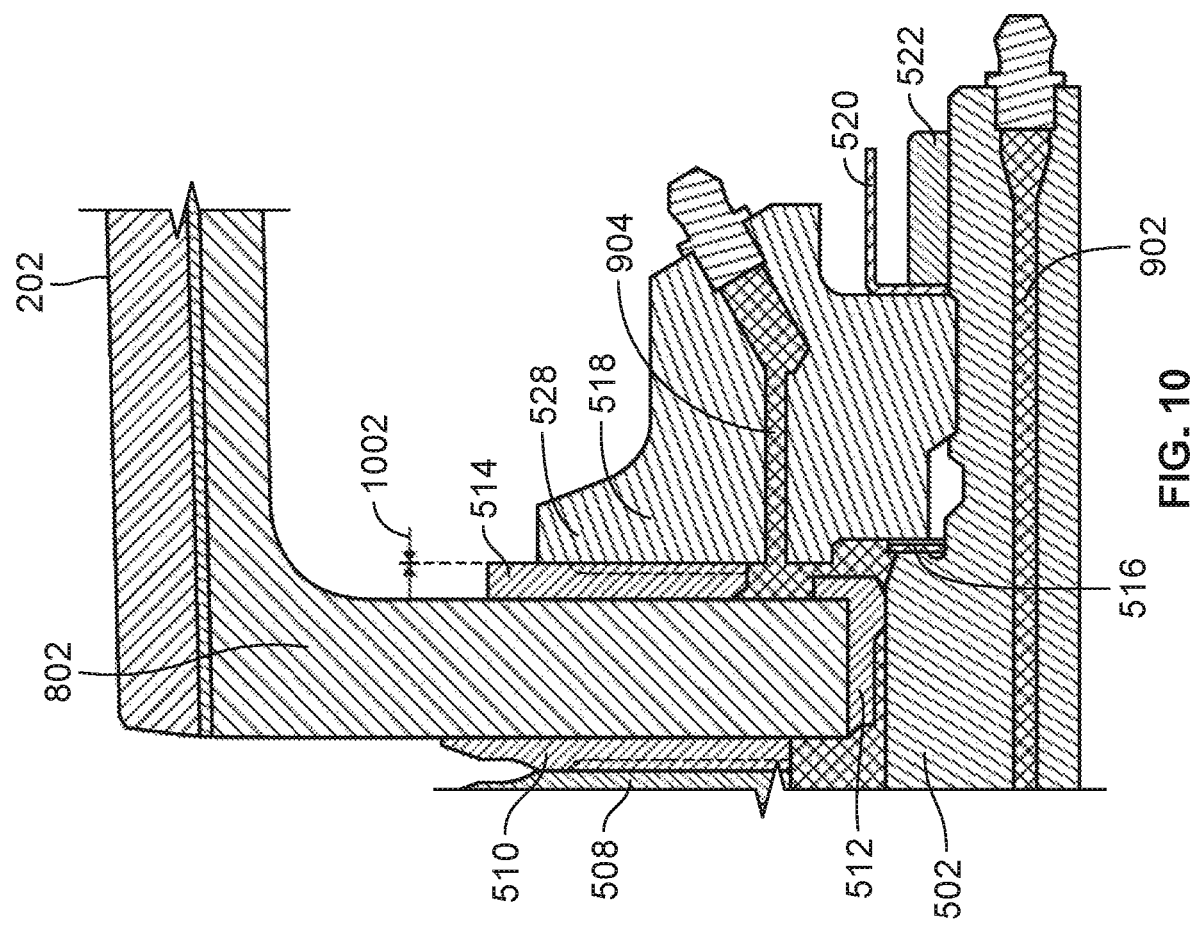
FIG. 10 is an enlarged view of a portion of FIG. 9.

FIG. 8 is a cross-sectional view of the example foldable wing 102 of FIGS. 1-4 and 7A taken along the example hinge axis 206 of FIGS. 2-4 and 7A. In the illustrated example of FIG. 8, the foldable wing 102 includes an example hinge pin joint 800 formed by an example rib 802 of the foldable tip structure 202, an example rib 804 of the fixed structure 204, and the hinge pin 500. The hinge pin 500 of the hinge pin joint 800 rotatably couples the foldable tip structure 202 to the fixed structure 204. As shown in FIG. 8, the second drive shaft 710 of the foldable wing 102 passes though the through hole 532 of the hinge pin 500. The rotary fold actuator 720 is operatively coupled to the second drive shaft 710, and the rotary fold actuator 720 is located on and/or coupled to the foldable tip structure 202. FIG. 9 is an enlarged view of the example hinge pin joint 800 of FIG. 8. FIG. 10 is an enlarged view of a portion of FIG. 9.

In the illustrated example of FIGS. 8-10, the rib 802 of the foldable tip structure 202 and the rib 804 of the fixed structure 204 are positioned and/or located between the first flange 526 and the second flange 528 of the hinge pin 500. The rib 804 of the fixed structure 204 is positioned and/or located between the first wear plate 504 and the second wear plate 508 of the hinge pin 500 such that bearing surfaces of the rib 804 of the fixed structure 204 contact and/or abut the first wear plate 504, the first bushing rib set 506, and/or the second wear plate 508 of the hinge pin 500. In such an example, the first bushing rib set 506 provides a sliding surface for the hinge pin 500. The first bushing rib set 506 also transfers bearing loads into the rib 804 of the fixed structure 204. The first wear plate 504 and the second wear plate 508 provide wearable sliding surfaces to prevent wear on the first flange 526 of the hinge pin 500, and/or wear on the rib 804 of the fixed structure 204. The first wear plate 504 and the second wear plate 508 also transfer axial loads into the rib 804 of the fixed structure. The first flange 526 of the hinge pin 500 applies, absorbs, transfers, and/or otherwise distributes loads (e.g., single-shear loads) to, from, and/or among the first wear plate 504, the first bushing rib set 506, and/or the second wear plate 508 of the hinge pin 500, and/or the rib 804 of the fixed structure 204. The first flange 526 of the hinge pin 500 accordingly interfaces the rib 804 of the fixed structure 204.

Similarly, the rib 802 of the foldable tip structure 202 is positioned and/or located between the third wear plate 510 and the fourth wear plate 514 of the hinge pin 500 such that bearing surfaces of the rib 802 of the foldable tip structure 202 contact and/or abut the third wear plate 510, the second bushing rib set 512, and/or the fourth wear plate 514 of the hinge pin 500. In such an example, the second bushing rib set 512 provides a sliding surface for the hinge pin 500. The second bushing rib set 512 also transfers bearing loads into the rib 802 of the foldable tip structure 202. The third wear plate 510 and the fourth wear plate 514 provide wearable sliding surfaces to prevent wear on the second flange 528 of the hinge pin 500, and/or wear on the rib 802 of the foldable tip structure 202. The third wear plate 510 and the fourth wear plate 514 also transfer axial loads into the rib 802 of the foldable tip structure 202. The second flange 528 of the hinge pin 500 applies, absorbs, transfers, and/or otherwise distributes loads (e.g., single-shear loads) to, from, and/or among the third wear plate 510, the second bushing rib set 512, and/or the fourth wear plate 514 of the hinge pin 500, and/or the rib 802 of the foldable tip structure 202. The second flange 528 of the hinge pin 500 accordingly interfaces the rib 802 of the foldable tip structure 202.

In the illustrated example of FIGS. 8-10, the hinge bolt 502 of the hinge pin 500 includes one or more example grease path(s) 902. The hinge nut 518 of the hinge pin 500 also includes one or more example grease path(s) 904. As shown in FIGS. 9 and 10, the grease paths 902, 904 provide grease to various areas of the hinge pin joint 800 to reduce wear of the hinge pin joint 800.

The hinge pin joint 800 of FIGS. 8-10 is subjected to single-shear loading. The first flange 526 and the second flange 528 of the hinge pin 500 stabilize the hinge pin joint 800 in response to the single-shear loading. For example, the first flange 526 and the second flange 528 of the hinge pin 500 reduce non-uniform load distributions on respective bearing surfaces of the rib 802 of the foldable tip structure 202 and the rib 804 of the fixed structure 204 in response to the single-shear loading. Reacting loads on the first flange 526 and the second flange 528 of the hinge pin 500 prevent undesirable loading (e.g., undesirable axial loads, undesirable bending loads, etc.) on the bearing surfaces of the rib 802 of the foldable tip structure 202 and the rib 804 of the fixed structure 204, and also reduce and/or prevent wear at the hinge pin joint 800.

In some examples, an example gap 1002 is provided between the fourth wear plate 514 and the second flange 528 of the hinge pin 500. In some examples, the gap 1002 enables rotation of the hinge pin 500 of the hinge pin joint 800, as further described below. In some examples, the size, extent, and/or dimension of the gap 1002 may be based on the respective size(s), extent(s), and/or dimension(s) of the spacer(s) 516 of the hinge pin 500. In some examples, the gap 1002 may be sized and/or dimensioned to enable rotation of the hinge pin 500 of the hinge joint 800 while also ensuring that the first flange 526 and the second flange 528 effectively react loads.

In some examples, the hinge pin 500 of the hinge pin joint 800 freely rotates relative to the rib 802 of the foldable tip structure 202 and the rib 804 of the fixed structure 204. The freely-rotatable nature of the hinge pin 500 advantageously enables one of the two ribs 802, 804 of the hinge pin joint 800 to freely rotate relative to one of the two flanges 526, 528 of the hinge pin 500 even when the other one of the two ribs 802, 804 binds against the other one of the two flanges 526, 528. In some examples, the hinge pin 500 is freely rotatable when the foldable tip structure 202, the fixed structure 204, and/or, more generally, the foldable wing 102 is/are not subjected to in-flight loads (e.g., loads applied to the foldable tip structure 202, the fixed structure 204, and/or, the foldable wing 102 when the aircraft 100 is airborne). The foldable tip structure 202 may accordingly be freely rotatable relative to the fixed structure 204 in the absence of in-flight loads applied to the foldable wing 102. When in-flight loads are applied to the foldable tip structure 202, the fixed structure 204, and/or, more generally, the foldable wing 102, the rib 804 of the fixed structure 204 is forced against the first flange 526 of the hinge pin 500, and the rib 802 of the foldable tip structure 202 is forced against the second flange 528 of the hinge pin 500.

From the foregoing, it will be appreciated that the disclosed hinge pins for foldable aircraft wings advantageously include a first flange, a second flange spaced apart from the first flange along a central axis of the hinge pin, and a through hole oriented along the central axis. The hinge pin, a foldable tip structure of a foldable wing, and a fixed structure of the foldable wing form a hinge pin joint. The through hole of the hinge pin receives a drive shaft that is operatively coupled to a rotary fold actuator, thereby enabling the rotary fold actuator to advantageously be located on the foldable tip structure of the foldable wing. The first and second flanges of the hinge pin advantageously stabilize the hinge pin joint in response to single-shear loading. The first and second flanges of the hinge pin also advantageously reduce non-uniform load distributions on bearing surfaces of the foldable tip and fixed structures in response to single-shear loading. The hinge pin enables the foldable tip structure to fold relative to the fixed structure when the foldable wing is not subjected to in-flight loads. The hinge pin advantageously reacts in-flight loads (e.g., axial loads, bending loads, etc.) when the foldable wing is in an unfolded position and the aircraft is airborne.

In some examples, an apparatus is disclosed. In some disclosed examples, the apparatus comprises a hinge pin. In some disclosed examples, the hinge pin is to rotatably couple a foldable tip of an aircraft wing to a fixed structure of the aircraft wing. In some disclosed examples, the hinge pin includes a first flange, a second flange spaced apart from the first flange along a central axis of the hinge pin, and a through hole oriented along the central axis.

In some disclosed examples, the through hole is to receive a drive shaft. In some disclosed examples, the drive shaft includes a first end and a second end. In some disclosed examples, the first end of the drive shaft is operatively coupled to a drive component located on the fixed structure. In some disclosed examples, the second end of the drive shaft is operatively coupled to a rotary fold actuator located on the foldable tip.

In some disclosed examples, the first flange is to interface the fixed structure and the second flange is to interface the foldable tip. In some disclosed examples, the hinge pin, the foldable tip, and the fixed structure are to form a hinge pin joint. In some disclosed examples, the hinge pin joint is to be subjected to single-shear loading. In some disclosed examples, the first flange and the second flange are to stabilize the hinge pin joint in response to the single-shear loading. In some disclosed examples, the first flange and the second flange are to reduce non-uniform load distributions on bearing surfaces of the foldable tip and the fixed structure in response to the single-shear loading. In some disclosed examples, the hinge pin is to enable the foldable tip to fold relative to the fixed structure when the aircraft wing is not subjected to in-flight loads.

In some disclosed examples, the hinge pin further includes a hinge bolt, a first wear plate, a first bushing rib set, a second wear plate, a third wear plate, a second bushing rib set, a fourth wear plate, a hinge nut, a lock washer, and a retaining nut. In some disclosed examples, the hinge bolt includes the first flange, the through hole, and a bolt shaft. In some disclosed examples, the bolt shaft passes through respective ones of additional through holes formed in corresponding ones of the first wear plate, the first bushing rib set, the second wear plate, the third wear plate, the second bushing rib set, the fourth wear plate, the hinge nut, the lock washer, and the retaining nut. In some disclosed examples, the hinge bolt further includes a first grease path, and the hinge nut includes a second grease path.

In some examples, an apparatus is disclosed. In some disclosed examples, the apparatus comprises a hinge pin joint. In some disclosed examples, the hinge pin joint includes a foldable tip of an aircraft wing, a fixed structure of the aircraft wing, and a hinge pin. In some disclosed examples, the hinge pin rotatably couples the foldable tip to the fixed structure. In some disclosed examples, the hinge pin includes a first flange, a second flange spaced apart from the first flange along a central axis of the hinge pin, and a through hole oriented along the central axis.

In some disclosed examples, the through hole receives a drive shaft having a first end and a second end. In some disclosed examples, the first end of the drive shaft is operatively coupled to a drive component located on the fixed structure. In some disclosed examples, the second end of the drive shaft is operatively coupled to a rotary fold actuator located on the foldable tip.

In some disclosed examples, the first flange interfaces the fixed structure. In some disclosed examples, the second flange interfaces the foldable tip. In some disclosed examples, the hinge pin joint is subjected to single-shear loading. In some disclosed examples, the first flange and the second flange stabilize the hinge pin joint in response to the single-shear loading. In some disclosed examples, the hinge pin enables the foldable tip to fold relative to the fixed structure when the aircraft wing is not subjected to in-flight loads.

In some examples, a foldable aircraft wing is disclosed. In some disclosed examples, the foldable aircraft wing comprises a foldable tip, a fixed structure, and a hinge pin. In some disclosed examples, the hinge pin rotatably couples the foldable tip to the fixed structure. In some disclosed examples, the hinge pin includes a first flange, a second flange spaced apart from the first flange along a central axis of the hinge pin, and a through hole oriented along the central axis.

In some disclosed examples, the through hole receives a drive shaft having a first end and a second end. In some disclosed examples, the first end of the drive shaft is operatively coupled to a drive component located on the fixed structure. In some disclosed examples, the second end of the drive shaft is operatively coupled to a rotary fold actuator located on the foldable tip.

In some disclosed examples, the first flange interfaces the fixed structure and the second flange interfaces the foldable tip. In some disclosed examples, the hinge pin, the foldable tip, and the fixed structure form a hinge pin joint. In some disclosed examples, the hinge pin joint is subjected to single-shear loading. In some disclosed examples, the first flange and the second flange stabilize the hinge pin joint in response to the single-shear loading. In some disclosed examples, the hinge pin enables the foldable tip to fold relative to the fixed structure when the foldable aircraft wing is not subjected to in-flight loads.

In some examples, a method is disclosed. In some disclosed examples, the method comprises moving a foldable tip of an aircraft wing between a folded position and an unfolded position relative to a fixed structure of the aircraft wing. In some disclosed examples of the method, the aircraft wing includes a hinge pin rotatably coupling the foldable tip to the fixed structure. In some disclosed examples of the method, the hinge pin includes a first flange, a second flange spaced apart from the first flange along a central axis of the hinge pin, and a through hole oriented along the central axis.

In some disclosed examples, the method further comprises subjecting a hinge pin joint of the aircraft wing to single-shear loading. In some disclosed examples of the method, the hinge pin joint is formed by the hinge pin, the foldable tip, and the fixed structure. In some disclosed examples, the method further comprises stabilizing the hinge pin joint via the first flange and the second flange in response to the single-shear loading. In some disclosed examples, the method further comprises reducing non-uniform load distributions on bearing surfaces of the foldable tip and the fixed structure via the first flange and the second flange in response to the single-shear loading.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
    a hinge pin to rotatably couple a foldable tip of an aircraft wing to a fixed structure of the aircraft wing, the hinge pin including:
        a hinge bolt having a bolt shaft oriented along a central axis of the hinge pin, a first flange extending away from the bolt shaft, and a through hole oriented along the central axis and extending through the bolt shaft; and
        a hinge nut having a second flange spaced apart from the first flange along the central axis, and a hinge nut through hole oriented along the central axis, the bolt shaft extending through the hinge nut through hole.

2. The apparatus of claim 1, wherein the through hole is to receive a drive shaft.

3. The apparatus of claim 2, wherein the drive shaft includes a first end and a second end, the first end of the drive shaft being operatively coupled to a drive component located on the fixed structure, the second end of the drive shaft being operatively coupled to a rotary fold actuator located on the foldable tip.

4. The apparatus of claim 1, wherein the first flange is to interface the fixed structure and the second flange is to interface the foldable tip.

5. The apparatus of claim 1, wherein the hinge pin, the foldable tip, and the fixed structure are to form a hinge pin joint, the hinge pin joint to be subjected to single-shear loading.

6. The apparatus of claim 5, wherein the first flange and the second flange are to stabilize the hinge pin joint in response to the single-shear loading.

7. An apparatus, comprising:
    a hinge pin joint including a foldable tip of an aircraft wing, a fixed structure of the aircraft wing, and a hinge pin, the hinge pin rotatably coupling the foldable tip to the fixed structure, the hinge pin including:
        a hinge bolt having a bolt shaft oriented along a central axis of the hinge pin, a first flange extending away from the bolt shaft, and a through hole oriented along the central axis and extending through the bolt shaft; and
        a hinge nut having a second flange spaced apart from the first flange along the central axis, and a hinge nut through hole oriented along the central axis, the bolt shaft extending through the hinge nut through hole.

8. The apparatus of claim 7, wherein the through hole receives a drive shaft having a first end and a second end, the first end of the drive shaft being operatively coupled to a drive component located on the fixed structure, the second end of the drive shaft being operatively coupled to a rotary fold actuator located on the foldable tip.

9. The apparatus of claim 7, wherein the first flange interfaces the fixed structure, the second flange interfaces the foldable tip, and the hinge pin joint is subjected to single-shear loading.

10. The apparatus of claim 9, wherein the first flange and the second flange stabilize the hinge pin joint in response to the single-shear loading.

11. The apparatus of claim 7, wherein the hinge pin enables the foldable tip to fold relative to the fixed structure when the aircraft wing is not subjected to in-flight loads.

12. A foldable aircraft wing, comprising:
    a foldable tip;
    a fixed structure; and
    a hinge pin rotatably coupling the foldable tip to the fixed structure, the hinge pin including:
        a hinge bolt having a bolt shaft oriented along a central axis of the hinge pin, a first flange extending away from the bolt shaft, and a through hole oriented along the central axis and extending through the bolt shaft; and
        a hinge nut having a second flange spaced apart from the first flange along the central axis, and a hinge nut through hole oriented along the central axis, the bolt shaft extending through the hinge nut through hole.

13. The foldable aircraft wing of claim 12, wherein the through hole receives a drive shaft having a first end and a second end, the first end of the drive shaft being operatively coupled to a drive component located on the fixed structure, the second end of the drive shaft being operatively coupled to a rotary fold actuator located on the foldable tip.

14. The foldable aircraft wing of claim 12, wherein the first flange interfaces the fixed structure and the second flange interfaces the foldable tip, and wherein the hinge pin, the foldable tip, and the fixed structure form a hinge pin joint subjected to single-shear loading.

15. The foldable aircraft wing of claim 14, wherein the first flange and the second flange stabilize the hinge pin joint in response to the single-shear loading.

16. The foldable aircraft wing of claim 12, wherein the hinge pin enables the foldable tip to fold relative to the fixed structure when the foldable aircraft wing is not subjected to in-flight loads.

17. A method, comprising:
    moving a foldable tip of an aircraft wing between a folded position and an unfolded position relative to a fixed structure of the aircraft wing, the aircraft wing including a hinge pin rotatably coupling the foldable tip to the fixed structure, the hinge pin including a hinge bolt having a bolt shaft oriented along a central axis of the hinge pin, a first flange extending away from the bolt shaft, and a through hole oriented along the central axis and extending through the bolt shaft, the hinge pin further including a hinge nut having a second flange spaced apart from the first flange along the central axis, and a hinge nut through hole oriented along the central axis, the bolt shaft extending through the hinge nut through hole.

18. The method of claim 17, further comprising subjecting a hinge pin joint of the aircraft wing to single-shear loading, the hinge pin joint being formed by the hinge pin, the foldable tip, and the fixed structure.

19. The method of claim 18, further comprising stabilizing the hinge pin joint via the first flange and the second flange in response to the single-shear loading.

20. The method of claim 18, further comprising reducing non-uniform load distributions on bearing surfaces of the foldable tip and the fixed structure via the first flange and the second flange in response to the single-shear loading.

21. The foldable aircraft wing of claim 12, wherein the foldable tip includes a first rib, wherein the fixed structure includes a second rib, wherein the hinge pin includes a first wear plate, a second wear plate, a third wear plate, and a fourth wear plate respectively located between the first and second flanges, wherein the first rib is located between the third and fourth wear plates, wherein the second rib is located between the first and second wear plates, and wherein the bolt shaft extends through the first, second, third and fourth wear plates.

* * * * *